Sept. 4, 1962 R. WINDELS 3,052,881
SONAR NOISE GENERATOR
Filed Jan. 17, 1956 4 Sheets-Sheet 1

INVENTOR.
RICHARD WINDELS

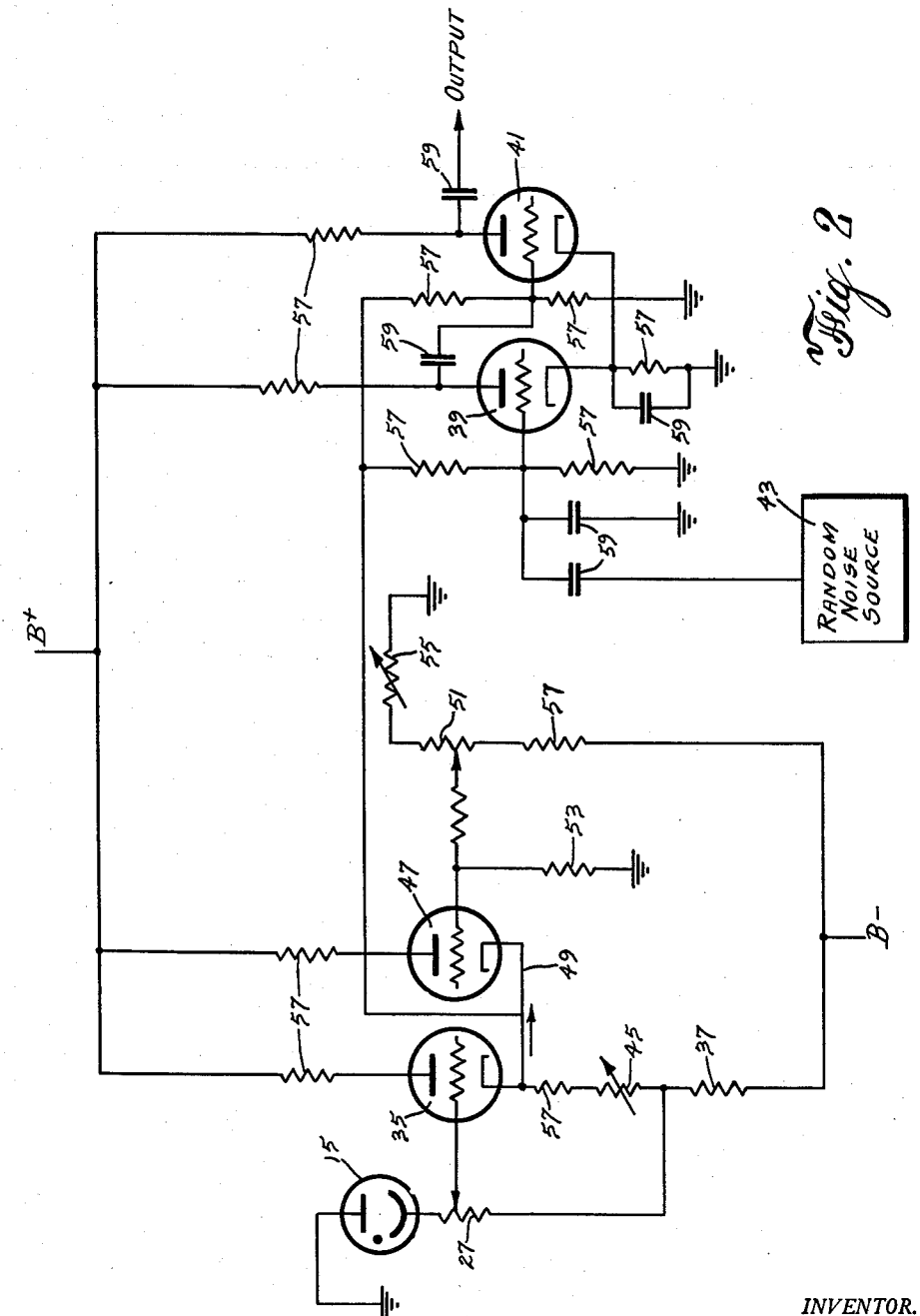

Sept. 4, 1962 R. WINDELS 3,052,881
SONAR NOISE GENERATOR
Filed Jan. 17, 1956 4 Sheets-Sheet 4

INVENTOR.
RICHARD WINDELS
BY
Lawrence S. Epstein
ATTORNEYS

3,052,881
SONAR NOISE GENERATOR
Richard Windels, Darien, Conn., assignor, by mesne assignments, to the United States of America as represented by the Secretary of the Navy
Filed Jan. 17, 1956, Ser. No. 559,751
5 Claims. (Cl. 340—384)

This invention relates to improvements in sound simulating means, and more particularly pertains to means for the simulation of sounds comprising repetitive beats of random noise energy, such as the simulation of noise from a target ship propeller as heard over a sonar listening device. Such a simulated noise can be utilized in training sonar crews to discriminate the existence of response conditions and to interpret such conditions.

The power versus time characteristics of the noise from a target ship propeller, as heard over a sonar listening device, is essentially a triangular wave having a repetition rate that varies with the speed of the ship. There is also a tendency for every third or fourth beat of the sound to be accentuated, due to inequalities in the shape of the propeller blades. Another characteristic of the sound is the initial amplitude and distinctness of each beat, and a further distinguishing feature is the tendency for the distinctiveness of the individual beats to vary as the axis of the target ship is changed with respect to the listening sonar.

One prior method of simulating a propeller beat envelope consists essentially of a relaxation type oscillator having a triangular wave shape. The output of this oscillator is used to modulate a random noise, and is further used to pulse a ring type counter. The condition of one trigger half of the ring counter is used to vary the amplitude of every third or fourth beat, depending on the number of trigger stages in the counter ring.

One disadvantage of this prior method stems from the tendency of a ring type counter to acquire false counts that remain in the counter permanently. Removal of these counts can be achieved by operating a "reset" switch, or the likelihood of false counts can be corrected by the use of a binary counter and feedback loop in place of the ring type counter. However, the remedial effectiveness is limited, and such prior system has the added disadvantage inherent in the difficulty of setting the rate of a relaxation oscillator accurately over a wide range.

In sonar listening simulation, these disadvantages manifest themselves by generating a false count in the counter that destroys the desired sound simulation. The inaccuracy of the relaxation oscillator rate leads to a lack of correlation between the speed of the target ship and the speed of such ship as calculated from a propeller beat count.

The primary object of this invention is to provide improved means to simulate sounds comprising repetitive beats of random noise energy.

Another object is to provide improved means to simulate the noise from a target ship propeller as heard over a sonar listening device, for use in training crews to discriminate the existence of responsive conditions and to interpret such conditions.

A further object is to provide means to so simulate the noise from a target ship propeller as heard over a sonar listening device that correlation is maintained between the speed of the target ship and the speed of such ship is calculated from a propeller beat count.

Other objects and many of the attendant advantages of this invention will be readily appreciated as the same becomes better understood by reference to the following detailed description when considered in connection with the accompany drawings wherein:

FIG. 2 is a circuit diagram of the amplifier, noise generator and modulator of the system;

Similar numerals refer to similar parts throughout the several views.

Figure 1:
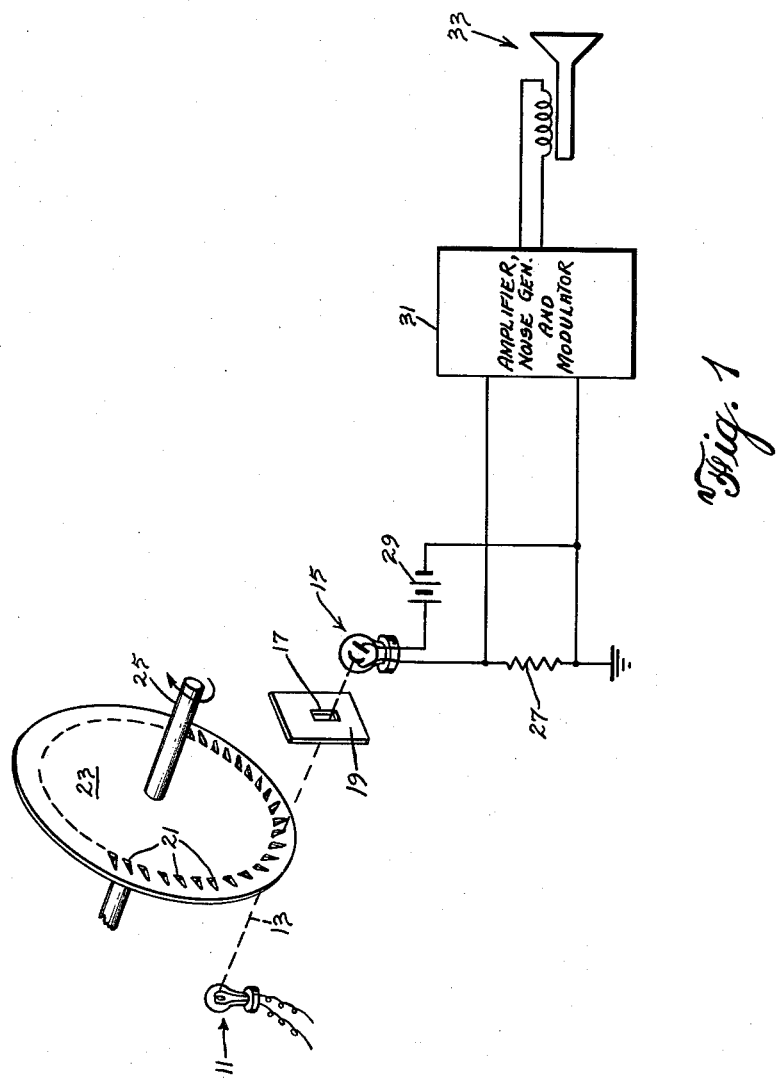
FIG. 1 is a schematic and diagrammatic showing of a sonar noise generator, showing a preferred embodiment of the invention.

Individual propeller blade beats are generated by the system shown in FIG. 1, which uses a photocell and an opaque disk having shaped apertures in conjunction with electronic circuits to accomplish simulation of sound as heard in a sonar listening device. The light source 11 produces a beam of light 13 that energizes a photoelectric cell 15. The light beam is defined by being passed through the stationary slot 17 of an opaque mask 19, and is repetitively transmitted through a multiplicity of peripheral triangular apertures 21 of an opaque disk 23. As the disk 23 rotates on its shaft 25, the amplitude of the voltage across a resistor 27, which is connected serially with the photoelectric cell 15 and a source of voltage 29, varies in time with the radial length of the aperture 21 immediately in line with the slot 17. Thus a series of triangular apertures 21 in the disk 23 will generate a series of triangular waves that can be used to simulate the sound of a propeller by being fed through an amplifier, random noise generator and modulator 31 to a speaker 33. An accented beat is simulated by rendering every third or fourth aperture 21 larger in its radial dimension than the two or three adjacent apertures.

To explain in more detail why the output pulses from the aperture wheel are proportional to the radial length of the aperture immediately in line with the slot 17, three sketches 6a, 6b, and 6c are provided. In 6a, the aperture DEF is beginning to overlap the opening of the rectangular stationary slot. The output voltage from photocell 15 at this instant is proportional to the triangular area FGH. The output voltage increases in value from 0 to a maximum when the entire area of the aperture DEF overlaps the rectangular slot area as in sketch 6b. The value of the output voltage increases in accordance with the increasing, substantially triangular area of the aperture which overlaps the rectangular slot. As can be seen from inspection of the sketches, the area of the triangle FGH is proportional to the radial length GH and the area of the triangle DEF is proportional to DE. It can thus be said that the area of the overlapping triangle varies in time with the radial length of the aperture immediately in line with the slot and therefore that the value of the output voltage varies in time with the radial length of the aperture immediately in line with the slot. After the maximum voltage is reached, the value of the output voltage decreases by an amount equal to the value of the triangular area FLM, as shown in sketch 6c. The triangular area increases until the value of the output pulse goes to 0. Thus, a substantially triangular output pulse is formed.

The voltage developed across resistor 27 is applied between the grid and cathode of an amplifier stage electron tube 35, as shown in FIG. 2. The load resistor 37 of this amplifier stage is connected in series with the cathode of said stage to prevent the signal from being inverted. The D.-C. output of amplifier tube 35 is taken from the cathode and is applied simultaneously to the control electrodes of amplifier tubes 39 and 41. The stages 39 and 41 are operated normally near cutoff condition.

Random noise from a random noise source 43 is applied to the control grid of tube 39. When an aperture 21 on the disk 23 is aligned with slot 17, causing the photocell 15 to be excited, the voltage on the cathode of tube 35 rises, allowing tubes 39 and 41 to conduct. When a triangular waveshape is applied to the control grids of tubes 39 and 41 simultaneously, and random noise from source 43 is applied to the control grid of the tube 39, the output obtained on tube 41 is a series of triangular waves.

Figures 3A, 3B, 3C:
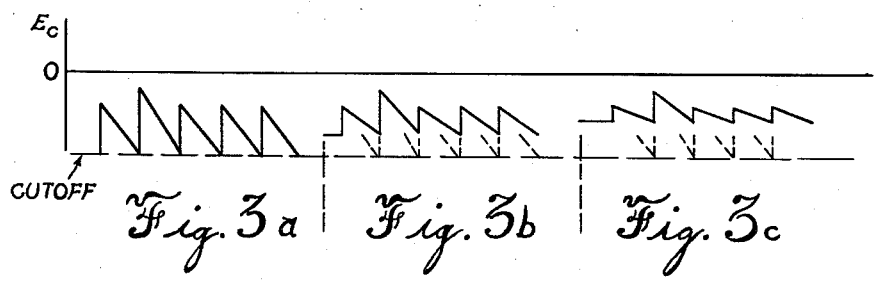
FIGS. 3a, 3b and 3c show the form of the signals at the grids of the amplifier tubes.
Figures 4A, 4B, 4C:
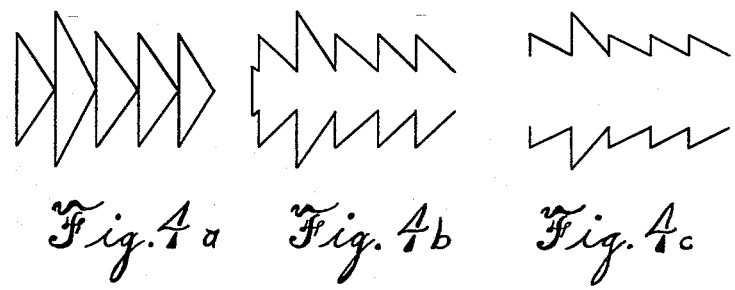
FIGS. 4a, 4b and 4c show the form of the signals at the output of the second amplifier tube.

The envelope signals at the grids of tubes 39 and 41 are shown in FIGS. 3a, 3b and 3c. FIGS. 4a, 4b and 4c show the signals at the output of tube 41 when the grids of tubes 39 and 41 are excited as shown in the corresponding FIGS. 3a, 3b and 3c. If the resistance of variable resistor 45 in the cathode circuit of tube 35 is decreased, the bias on the grid of tube 35 is reduced, and thus the D.-C. level of the cathode of that tube rises. This causes the D.-C. level at the control grids of tubes 39 and 41 to become less negative and permits said tubes to conduct continuously. If the signal from the photocell 15 is reduced simultaneously by adjusting resistor 27 so that the peak level at the grids of tubes 39 and 41 is the same as before, then the grid and plate signals will be as shown in FIGS. 3b and 4b. These figures show a target ship whose propeller beats are less distinct than those of FIGS. 3a and 4a. FIGS. 3c and 4c show the signals after further rotation of the controls.

Figures 5A, 5B, 5C:
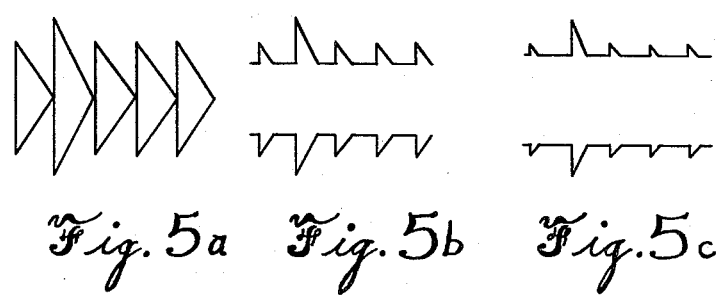
FIGS. 5a, 5b and 5c show the form of the signals resulting from rotation of a potentiometer of a negative limiter stage.
Figure 6A:
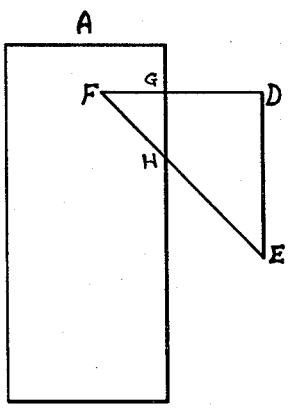
FIGURES 6a, 6b, 6c show the disc aperture and slot spacial relationship.
Figure 6B:
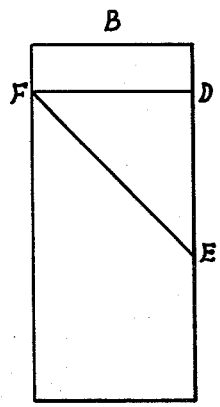
Figure 6C:
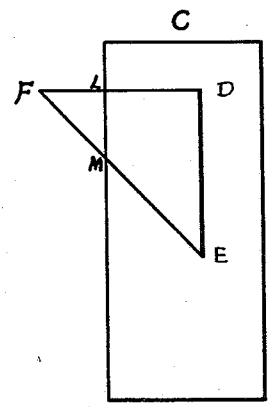

Tube 47 provides a stage that serves as a clamp or limiter on the negative excursion of the signal in conductor 49, independent of the setting of resistor 45. The signal in conductor 49 cannot fall below the value determined by the voltage at the grid of tube 47, and this voltage is controlled by the setting of variable potentiometer 51. Thus, potentiometer 51 represents another means of controlling the distinctiveness of the beats as the heading of the target with respect to the sonar is varied. FIGS. 5a, 5b and 5c show the effect of rotation of potentiometer 51 on the signals when potentiometers 45 and 27 are adjusted for the conditions shown in FIGS. 3a and 4a. Any similar functions could be applied to the grid of tube 47 by means of resistor 53, here shown grounded, or another variable resistor 55 tied to the grid of tube 47, or alternatively to the grid of a tube having a cathode connected similarly to the cathodes of tubes 35 and 47.

Suitable resistors 57 and condensers 59 are provided in the circuitry shown in FIG. 2, the valves and situs of each such element affording the circuit characteristics and parameters above indicated.

Obviously many modifications and variations of the present invention are possible in the light of the above teachings. It is therefore to be understood that within the scope of the appended claims the invention may be practiced otherwise than as specifically described.

I claim:
1. A device for simulating sounds heard over a sonar listening device comprising, a photo-electric means producing triangular wave forms with variation in size of certain of the wave forms so that they are representative of a ship's propellers having inequalities in the shape of its blades as heard over sonar listening devices, a noise generating means producing random noise representative of background noises, and modulating means coupled to said photo-electric means and said noise generating means so that the random noise is modulated by the triangular wave forms.

2. The structure of claim 1 including adjusting means coupled to said photo-electric means to vary the distinctness of the triangular wave forms so they will be representative of ships' propeller beats of varying distinctness.

3. The structure of claim 1 including control means coupled to said photo-electric means to vary the distinctiveness of the triangular wave forms so they will be representative of ships' propeller beats of various headings with respect to the sonar receiver.

4. The structure of claim 1 including adjusting means coupled to said photo-electric means to vary the distinctness of the triangular wave forms so they will be representative of ships' propeller beats of varying distinctness and control means coupled to said photo-electric means to vary the distinctiveness of the triangular wave forms so that they will be representative of the ships' propeller beats of various headings with respect to said sonar listening devices.

5. The structure of claim 4 wherein said photo-electric means includes a light source, a photo-electric cell situated in front of said light source, a light defining means consisting of a stationary opaque mask with a slot therein and an opaque disk with a multiplicity of peripheral triangular apertures therein situated between said light source and said photo-electric cell.

References Cited in the file of this patent
UNITED STATES PATENTS

| | | |
|---|---|---|
| 1,337,737 | Van der Bijl | Apr. 20, 1920 |
| 1,475,583 | Hoxie | Nov. 27, 1923 |
| 2,468,042 | Cranberg | Apr. 26, 1949 |
| 2,483,226 | Newman | Sept. 27, 1949 |
| 2,524,807 | Kallmann | Oct. 10, 1950 |
| 2,898,587 | Nye | Aug. 4, 1959 |

OTHER REFERENCES

"Photoelectric Tone Generator," Greenlee, Electronics, September 1946, pages 93–95.

"The Generation and Measurement of Low Freq. Noise," Bennett et al., Journal of Applied Physics, vol. 22, No. 9, September 1951, pages 1187–1188.

Seely: "Electron Tube Circuits," page 320, 1950.